United States Patent Office.

ORAZIO LUGO, OF BALTIMORE, MARYLAND.

*Letters Patent No. 99,924, dated February 15, 1870.*

IMPROVEMENT IN THE MANUFACTURE OF FERTILIZERS AND IN EXTRACTING OILS AND FATS.

*The Schedule referred to in these Letters Patent and making part of the same.*

Be it known that I, ORAZIO LUGO, of the city and county of Baltimore, State of Maryland, have invented certain new and useful Improvements in the Manufacture of Manure and Oils and Fats; and I do hereby declare the following to be a correct description thereof.

The nature of my invention consists in treating and desiccating fish, offals, scraps, crackling, blood, and other animal matters, in chambers or kilns or vessels, or in such apparatus as described in Letters Patent No.      , granted to W. J. Hooper, Theodore Hooper, and myself, by means of sulphurous acid (SO2,) or with nitrous fumes and sulpurous acid either alone or in connection with hot air, as set forth in Letters Patent No. 97,939, granted to me December 14, 1869, for the use of hot air either alone or with antiseptics, for the purpose therein described.

I use the sulphurous acid, or nitrous fumes and sulphurous acid, to accomplish the same purpose; in connection with vapors of water at high temperature or with gases derived from the combustion of fuel, or with other gases either under pressure or not, for the purpose hereafter more fully specified.

In order to enable those skilled in the science and art to apply my invention, I will proceed to describe the operation.

The fish or offals, scraps, cracklings, blood, or whatever animal substances it is desired to treat, are placed in a suitable apparatus, as above mentioned. Sulphurous acid, or nitrous fumes and sulphurous acid mixed, or in connection with hot air, is introduced in such apparatus, and made to come in contact with the fish or offals, &c.

The water of said animal matters will be readily eliminated by the hot gases, while the acid vapors above mentioned will form valuable compounds with the alkaline gases set free by the animal matter, and also arrest decomposition when necessary.

When the animal substance is dry the mass is taken out of the apparatus and pulverized.

When it is desired to obtain the oil of the fish and the fats of the animal matter the operation is commenced with a low temperature. The temperature is gradually increased as the operation progresses. The oil of the fish and the fats of the animal matters separate with the water contained in said substances and are collected. In this case the nitrous fumes may be dispensed with at the commencement of the operation.

The sulphurous acid and nitrous fumes are produced as set forth in chemical treatises, or may be produced in a suitable furnace by burning the necessary quantity of sulphur with the fuel, and at the same time producing the nitrous fumes by means of chemical substances for that purpose.

The gases from the combustion of fuel and the sulphurous and nitrous vapors may be carried by any known means to the chamber or kiln containing any of the above mentioned substances.

In this latter instance the hot air is dispensed with, as the hot gases from the combustion of fuel answer the same purpose.

Steam or vapors of water is generated by the hot gases or by external application of heat from the water contained in the animal matter. The sulphurous and nitrous vapors are allowed to mix or come in contact with said watery vapors.

Having thus described the several parts of my invention,

What I claim, and desire to secure by Letters Patent of the United States, is—

1. Treating and desiccating fish, offals, scraps, crackling, blood, and other animal matter, for the production of guanos or fertilizers and oil and fat with sulphurous acid (SO2), or with nitrous fumes and sulphurous acid separate or in connection with hot air, steam, or vapors of water at high temperature, or with gases, from the combustion of fuel, or other suitable gases either under pressure or not, for the purpose set forth.

2. The improved fertilizer produced by treating fish, offals, scraps, cracklings, blood, and other animal matter, with sulphurous acid or with nitrous fumes and sulphurous acid in connection with hot air or other gases or vapors, as herein set forth.

ORAZIO LUGO.

Witnesses:
   THOMAS C. CONNOLLY,
   I. N. BURRITT.